United States Patent
Kim (10) Patent No.: US 6,704,059 B2
(45) Date of Patent: Mar. 9, 2004

(54) PARTIAL FRACTIONALLY SPACED CHANNEL EQUALIZER FOR DIGITAL TELEVISION

(75) Inventor: Joon Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 369 days.

(21) Appl. No.: 09/754,338

(22) Filed: Jan. 5, 2001

(65) Prior Publication Data

US 2001/0007479 A1 Jul. 12, 2001

(30) Foreign Application Priority Data

Jan. 7, 2000 (KR) ............................................ 2000-625

(51) Int. Cl.[7] .................................................. H04N 5/21
(52) U.S. Cl. ........................................ 348/614; 375/234
(58) Field of Search ................................ 348/608, 630, 348/470, 723, 21, 614; 375/232, 233, 234

(56) References Cited

U.S. PATENT DOCUMENTS

| | | | | |
|---|---|---|---|---|
| 5,642,382 A | * | 6/1997 | Juan ........................... | 375/232 |
| 6,141,378 A | * | 10/2000 | d'Oreye de Lantremange .. | 375/232 |
| 6,144,697 A | * | 11/2000 | Gelfand et al. ............. | 375/233 |
| 6,240,133 B1 | * | 5/2001 | Sommer et al. ............ | 375/232 |
| 6,441,843 B1 | * | 8/2002 | Limberg ...................... | 348/21 |
| 6,509,934 B1 | * | 1/2003 | Bao et al. .................... | 348/570 |
| 6,526,093 B1 | * | 2/2003 | Bao et al. .................... | 375/233 |

* cited by examiner

*Primary Examiner*—Victor R. Kostak
(74) *Attorney, Agent, or Firm*—Birch, Stewart, Kolasch & Birch, LLP (57) ABSTRACT

A partial fractionally spaced equalizer for a digital television includes, a feedforward filter unit for receiving an input signal sampled at a predetermined frequency, which is divided a first region having a symbol spaced tap and a second region having fractional spaced taps narrower than the symbol spaced tap, a feedback filter unit having symbol spaced taps, a equalizer signal generator for processing feedforward tap signals outputted from the feedforward filter unit and the feedback tap signals outputted from the feedback filter unit and generating equalizer signals, a slicer for slicing the equalizer signals to generate a decision data and outputting the decision data to the feedback filter unit, and an error generator for generating a compensating error signal by subtracting the equalizer signal from the decision data. When a sampled input signal (Si) of 21.52 MHz is received, a fractionally spaced tap is set for the region of the input signal where there is a noise to perform equalizing fractionally, while a symbol spaced tap is set for the other frequency region to equalize the input signal. Thus, the noise included in the input signal can be effectively removed, and the signal processing can be performed at a high speed. In addition, the size of its circuit can be reduced.

10 Claims, 7 Drawing Sheets

PARTIAL FRACTIONALLY SPACED CHANNEL EQUALIZER FOR DIGITAL TELEVISION

BACKGROUND OF THE INVENTION

1. Field of the Invention

The present invention relates to a channel equalizer for a digital television, and more particularly, to a partial fractionally spaced channel equalizer for a digital television which is capable of removing long and short ghosts.

2. Description of the Background Art

Generally, a channel equalizer compensates or equalizes a distortion generated when transmission signals pass multiple paths in a digital transmission system such as a high definition picture television. That is, the channel equalizer removed an interference noise generated in a digital television when a transmission channel is defective appears as a ghost phenomenon that images are overlapped on the digital TV screen.

Figure 1:
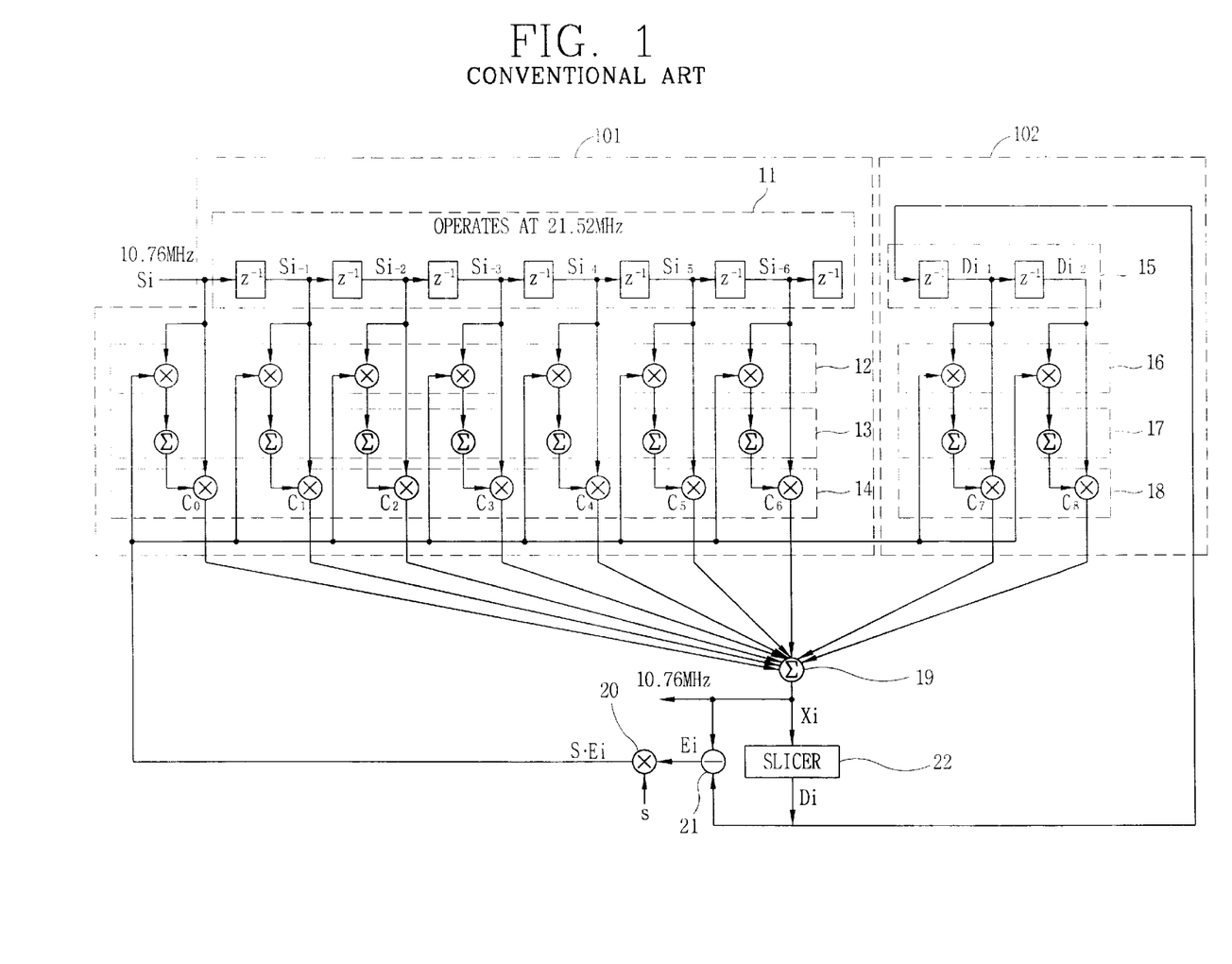
FIG. 1 is a schematic block diagram of a tap spaced decision feedback equalizer (TS-DFE) in accordance with a conventional art.

FIG. 1 is a schematic block diagram of a tap spaced decision feedback equalizer (TS-DFE) in accordance with a conventional art.

As shown in the drawing, the TS-DFE includes feedforward filter unit 101 for receiving a sampling input signal (Si) of 10.76 MHz, a feedback filter unit 102 for receiving sliced output signals of a slicer which will be explained later, an adder 19 for adding tap signals outputted from the feedforward filter unit 101 and the feedback filter unit 102 and generating an equalizer output signal (Xi), a slicer 22 for receiving the equalizer output signal (Xi) and outputting a decision data (Di), a subtractor 21 for subtracting the equalizer output signal (Xi) from the decision data (Di) and outputting an error signal (Ei), and a multiplier 20 for multiplying the error signal (Ei) and a step size (s) to generate a step error signal (sEi) and outputting the step error signal (sEi) to the feedforward filter unit 101 and the feedback filter unit 102.

The feedforward filter unit 101 includes a first delay array unit 11 having a plurality of delays ($Z^{-1}$) for receiving and sequentially delaying the input signal (Si) sampled at a sampling speed of 10.76 Mz, a first multiplying unit 12 having multipliers for respectively multiplying the delay signals (Si-1, Si-2, ... Si-6) outputted from the plurality of delays ($Z^{-1}$) and the previous error signals (sEi-1), a first adding unit 13 for accumulating the multiplying result of each multiplier in the first multiplying unit 12 and outputting coefficients (C0, C1, C2, ... C6), and a second multiplying unit 14 having a plurality of multipliers for respectively multiplying coefficients (C0, C1, C2, ..., C6) and the input signal (Si) and outputting feedforward filter tap signals.

Like the feedforward filter unit 101, the feedback filter unit 102 includes a second delay array unit 15 having a plurality of delays ($Z^{-1}$) for receiving the decision data (Di) from the slicer 22, sequentially delaying them, and outputting delay signals (Di-1, Di-2), a third multiplying unit 16 having multipliers for respectively multiplying the delay signals ((Di-1, Di-2) and the previous error signals (sEi-1), a second adding unit 17 for accumulating the multiplying result of each multiplier in the third multiplying unit 17 and outputting coefficients (C7 and C8), and a fourth multiplying unit 18 having a plurality of multipliers for respectively multiplying the coefficients (C7, C8) and the delay signals (Di-1, Di-2) and outputting feedback filter tap signals.

The operation of the conventional tap spaced decision feedback equalizer (TS-DFE) as described above will now be explained.

First, when the sampled input signal (Si) is inputted to the first delay array unit 11 of the feedforward filter unit 101, the delays in the first delay array unit 11 as many as taps respectively delay the input signal and generate delay signals (Si-1, Si-2, ..., Si-6). Each delayed signal (Si-1, Si-2, ... Si-6) and the input signal (Si) are outputted to the first and the second multiplying units 12 and 14.

At this time, the second multiplying unit 14 multiplies the input signal (Si) and the delayed signals (Si-1, Si-2, ... Si-6) and the coefficients (C0, C1, ..., C6) outputted from the first adding unit 13 to generate the feedforward filter tap signals, and outputs the feedforward filter tap signals to the adder 19. Then, the adder 19 adds the feedforward filter tap signals to generate an equalizer output signal (Xi) and outputs the equalizer output signal (Xi) to the subtractor 21 and the slicer 22.

Upon receipt of the equalizer output signal (Xi), the slicer 22 generates a decision data (Di) by using the equalizer output signal (Xi) and outputs it to the subtractor 21 and the second delay array unit 15 of the feedback filter unit 102.

The subtractor 21 subtracts the decision data (Di) from the equalizer output signal (Xi) and generates the error signal (Ei) and outputs it to the multiplier 20. Then, the multiplier 20 multipliers the error signal (Ei) by a predetermined step size (S) to generate a step error signal (sEi), and outputs the step error signal (sEi) to the first multiplying unit 12 of the feedforward filter unit 101 and the third multiplying unit 16 of the feedback filter unit 102.

Like the operation of the feedforward filter unit 101, the second delay array unit 15 of the feedback filter unit 102 receives the decision data (Di) from the slicer 22, sequentially delays it to generate delayed signals (Di-1, Di-2), and outputs them to the third and the fourth multiplying units 16 and 18. Then, the third multiplying unit 16 multiplies each delayed signal (Di-1, Di-2) and the previous error signals (sEi-1) outputted from the multiplier 20, and outputs the multiplying result to the second adding unit 17.

The second adding unit 17 accumulates the multiplying result to generate coefficients (C7, C8) and outputs them to the fourth multiplying unit 18.

The fourth multiplying unit 18 multiplies the delayed signals (Di-1, Di-2) by the coefficients (C7, C8) to generate feedback filter tap signals, and outputs the feedback filter tap signals to the adder 19, so that the feedback filter unit 102 is cooperatively operated with the feedforward filter unit 101.

Accordingly, the TS-DFE of the conventional art equalizes the 10.76 MHz input signal by using the seven taps of the feedforward filter unit 101 and the two taps of the feedback filter unit 102 which receive and sequentially delay the input signal (Si). That is, the TS-DFE updates the coefficients and the operation of which will be explained as below in detail.

The function of the first and the second adding units 13 and 17 is expressed by the following equation (1).

$$C(n+1)=C(n)+s \cdot Ei(n) \cdot Xi(n) \tag{1}$$

Where C(n) and C(n+1) denotes coefficients at a symbol time (n) and a symbol time (n+1), 's' denotes a step size, Ei(n) denotes an error signal outputted from the subtractor 21 at a symbol time 'n', and Xi(n) denotes an equalizer output signal outputted from the adder 19 at the symbol time 'n'. That is, the coefficient at the symbol time (n+1) can be expressed by the addition of the coefficient of the previous symbol time (n) and the value obtained by multiplying the equalizer output signal by the error signal having a predetermined step.

Figure 2:
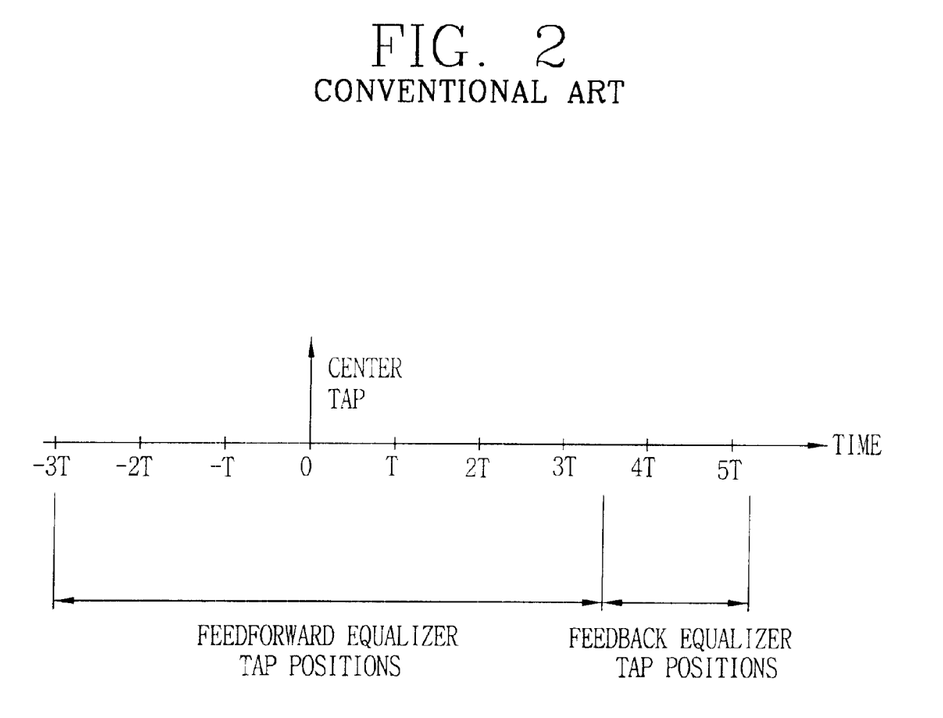
FIG. 2 is tap positions on a time axis of the TS-DFE of FIG. 1 in accordance with the conventional art.

FIG. 2 is tap positions on a time axis of the TS-DFE of FIG. 1, which show a removable preghost and postghost range referenced to a main tap. That is, the TS-DFE of FIG. 1 with 9 taps removes ghosts a from −3 T to 5 T Here, T is symbol time ($1/10.76$ MHz).

Accordingly, as for the TS-DFE of the conventional art, if the number of the taps is a lot in the filter unit, the distortion of a channel caused due to the long ghost at an external environment can be properly compensated, so that an interference between symbols can be easily removed.

However, with the conventional TS-DFE, a short ghost between symbols, for example, a reflection near the receiver by persons' motion, can not be removed. In addition, in case that a symbol time restoring circuit is not perfectly operated, the performance of the equalizer is possibly degraded due to the symbol time noise.

Figure 3:
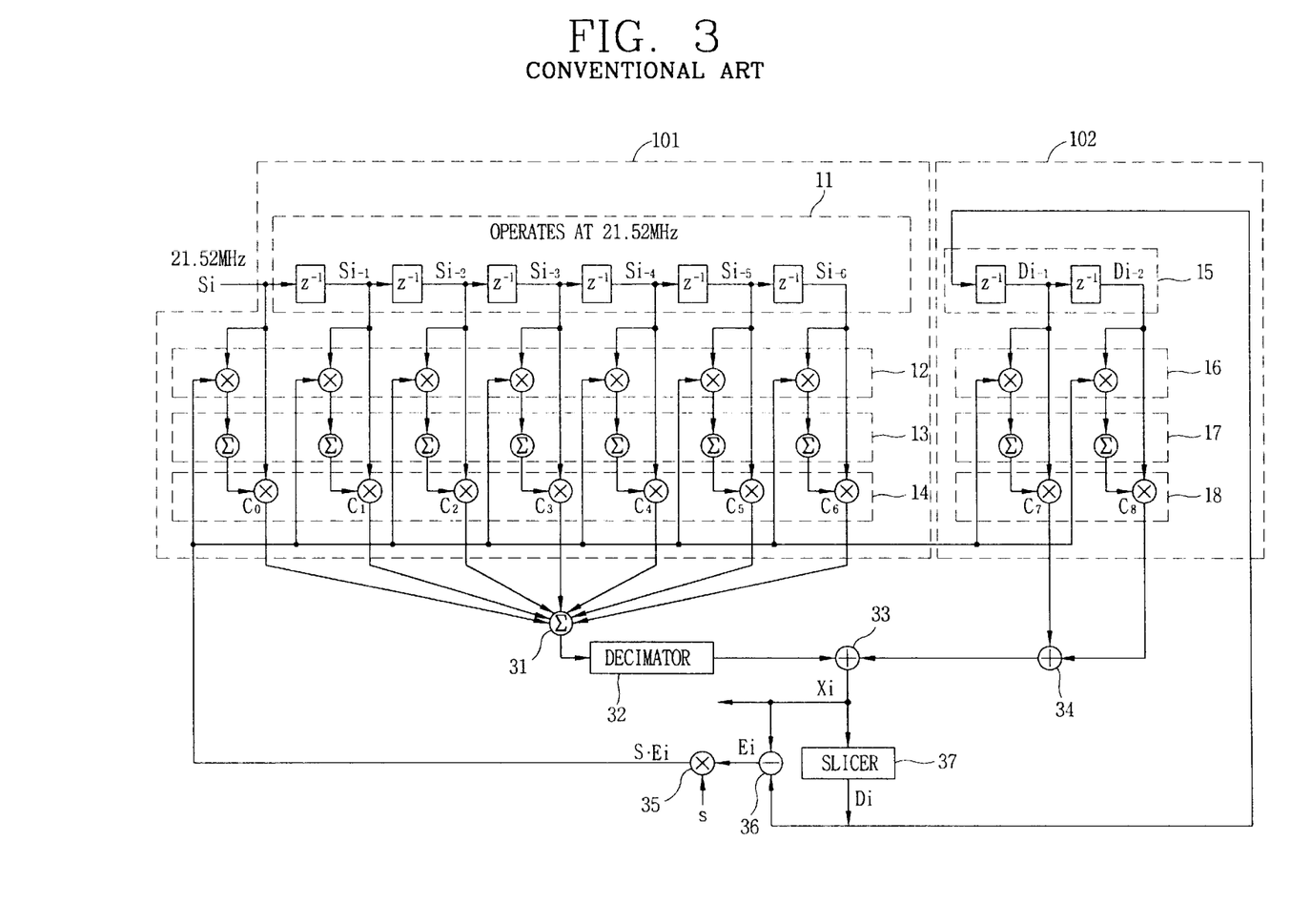
FIG. 3 is a schematic block diagram of a T/2 or half tap spaced decision feedback equalizer (T/2 TS-DFE) in accordance with a conventional art.

In an effort to solve the problem, there has been proposed an N times fractionally spaced channel equalizer as shown in FIG. 3 in which an input signal over-sampled by N times (N>=2) the above mentioned sampled input signal is received and N number of taps exist at one symbol position, thereby removing an echo signal generated within a very short time, while not much degrading its performance.

FIG. 3 is a schematic block diagram of a T/2 or half tap spaced decision feedback equalizer (T/2 TS-DFE) in accordance with a conventional art.

As shown in the drawing, the T/2 TS-DFE includes a feedforward filter unit 101 for receiving a sampling input signal (Si) of 21.52 MHz, a feedback filter unit 102 for receiving sliced output signals of a slicer which will be explained later, a first adder 31 for adding tap signals outputted from the feedforward filter unit 101, decimator 32 for down-sampling the addition results outputted from the first adder 31 for a predetermined time, a third adder 34 for adding tap signals outputted from the feedback filter unit 102, a second adder 33 for adding the output signal of the decimator 32 and the output signal of the third adder 34 and generating an equalizer output signal (Xi), a slicer 37 for receiving the equalizer output signal (Xi) and outputting a decision data (Di), a subtractor 36 for subtracting the equalizer output signal (Xi) from the decision data (Di) and outputting an error signal (Ei), and a multiplier 35 for multiplying the error signal (Ei) and a predetermined step size (s) to generate a step error signal (sEi), and outputting the step error signal (sEi) to the feedforward filter unit 101 and the feedback filter unit 102.

In this respect, the feedforward filter unit 101 and the feedback filter unit 102 are the same as those of the TS-DFE of FIG. 1.

The operation of the conventional T/2 TS-DFE constructed as described above will now be explained.

When the input signal (Si) having a 21.52 MHz sampling symbol rate is inputted to the first delay array unit 11 of the feedforward filter unit 101, delays ($Z^{-1}$) as many as the taps included in the first delay arraying unit 11 respectively delay the input signal Si to generate delayed signals (Si-1, Si-2, . . . , Si-6), and outputs the delayed signals (Si-1, Si-2, . . . , Si-6) and the input signal (Si) to the first and the second multiplying units 12 and 14.

At this time, the adders included in the first adding unit 13 respectively accumulate the signals outputted from the first multiplier 12 and generates coefficients (C0, C1, . . . , C6).

Then, the second multiplying unit 14 multiplies the input signal (Si) and the delayed signals (Si-1, Si-2, . . . , Si-6) by the coefficients (C0, C1, . . . , C6) outputted from the first adding unit 13 to generate feedforward filter tap signals and outputs them to the first adder 31, the first adder 31 adds the feedforward filter tap signals and outputs them to the decimator 32.

Upon receipt of the added feedforward filter tap signals, the decimator 32 samples and outputs a signal corresponding to the symbol time. Then, the second adder 33 adds the sampled signal outputted from the decimator 32 and the signal outputted from the third adder 34 to generates an equalizer output signal (Xi), and outputs the equalize output signal to the slicer 37 and the subtractor 36.

Upon receipt of the equalizer output signal (Xi), the slicer 37 generates a decision data (Di) by using the equalization signal (Xi) and outputs the decision data (Di) to the subtractor 36 and the second delay array unit 15 of the feedback filter unit 102.

At this time, when the subtractor 36 subtracts the equalizer output signal (Xi) from the decision data (Di) to generate an error signal (Ei) and outputs the error signal (Ei) to the multiplier 35, the multiplier 35 multiplies the error signal (Ei) by the step size (s) predetermined by a user to generate a step error signal (sEi), and outputs the step error signal (sEi) to the first multiplying unit 12 of the feedforward filter unit 101 and the third multiplying unit 16 of the feedback filter unit 102.

Meanwhile, like the operation of the feedforward filter unit 101, the second delay array unit 15 of the feedback filter unit 102 receives the decision data (Di) from the slicer 37, sequentially delays it to generate delayed signals (Di-1, Di-2), and outputs them to the third and the fourth multiplying units 16 and 18.

Then, the third multiplying unit 16 multiplies the delayed signals (Di-1, Di-2) by the previous error signals outputted from the multiplier 20 and outputs the multiplication result to the second adding unit 17.

The second adding unit 17 accumulates the multiplication result, generates coefficients (C7, C8) and outputs them to the fourth multiplying unit 18.

The fourth multiplying unit 18 multiplies the delayed signals (Di-1, Di-2) by the coefficient (C7, C8) to generate feedback filter tap signals and outputs the feedback filter tap signals to the third adder 34.

Then, the third adder 34 adds the feedback filter tap signals and outputs the addition result to the second adder 33, so that the feedback filter unit 102 is cooperatively operated with the feedforward filter unit 101.

Figure 4:
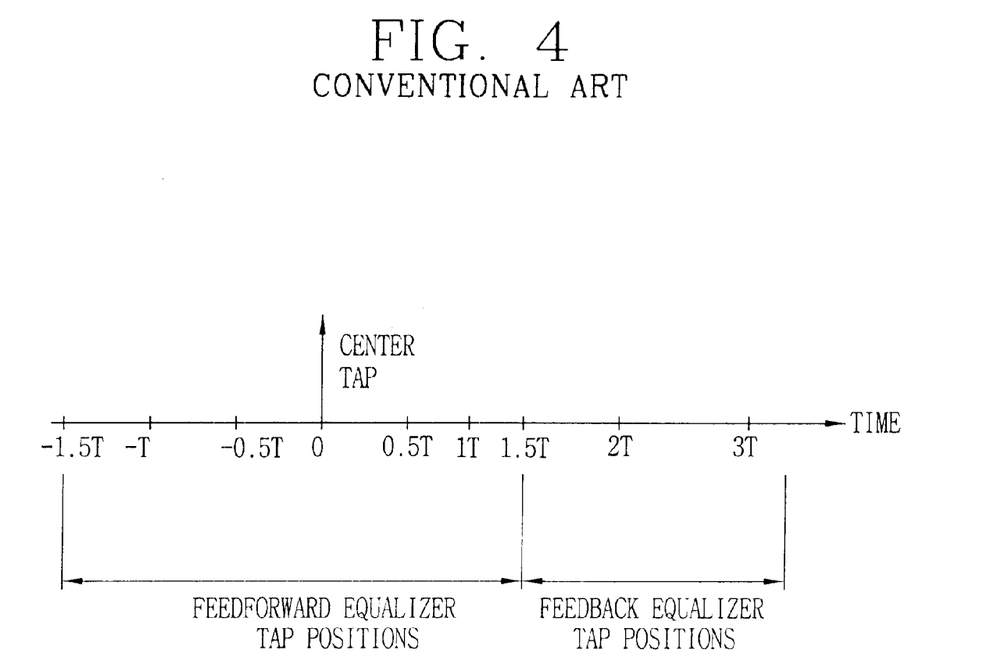
FIG. 4 is tap positions on a time axis of the T/2 TS-DFE of FIG. 3 in accordance with the conventional art.

FIG. 4 is tap positions on a time axis of the T/2 TS-DFE of FIG. 3, which show a removable preghost and postghost range referenced to a main tap. That is, the T/2 TS-DFE of FIG. 3 with 9 taps removes ghosts a from −1.5 T to 3 T Here, T is symbol time (1/10.76 MHz). In other words, as shown in FIG. 4, with the T/2 TS-DFE, seven taps are arranged between −1.5 T and 1.5 T centering the main tap (0) of the feedforward filter unit 101, and two taps are arranged between 2 T ad 3 T of the feedback filter unit 102, to thereby remove an echo signal between −1.5 T and 3 T.

However, in case of the conventional TS-DFE of FIG. 1, though it is favorable in that the ghost signal can be removed in the wide frequency range, that is, for example, between −3 T and 3 T by the feedforward filter unit consisting of seven taps, it has a problem that ghost between taps or symbols can not be removed.

Meanwhile, in case of the conventional T/2 TS-DFE of FIG. 3, the taps are arranged with its space reduced by half (for example, seven taps are arranged between the frequency range from −1.5 T to 1.5 T), thereby reducing the ghost between taps or symbols. However, in order to the ghost in the same range as the ghost range removed by the TS-DFE of FIG. 1, double the number of taps of TS-DFE of FIG. 1 are to be included. Thus, the T/2 TS-DFE of FIG. 3 has problems that the circuit size is enlarged, its hardware becomes complicated and the TS-DFE is not operated at a high speed.

SUMMARY OF THE INVENTION

Therefore, an object of the present invention is to provide a partial fractionally spaced equalizer for a digital television which is capable of removing both long and short ghosts by adjusting the number of taps in a filter, and of operating at a high speed with its circuit size reduced.

To achieve these and other advantages and in accordance with the purpose of the present invention, as embodied and broadly described herein, there is provided a partial fractionally spaced equalizer for a digital television comprising, a feedforward filter unit for receiving an input signal sampled at a predetermined frequency, which is divided a first region having a symbol spaced tap and a second region having fractional spaced taps narrower than the symbol spaced tap, a feedback filter unit having symbol spaced taps, a equalizer signal generator for processing feedforward tap signals outputted from the feedforward filter unit and the feedback tap signals outputted from the feedback filter unit and generating equalizer signals, a slicer for slicing the equalizer signals to generate a decision data and outputting the decision data to the feedback filter unit, and an error generator for generating a compensating error signal by subtracting the equalizer signal from the decision data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
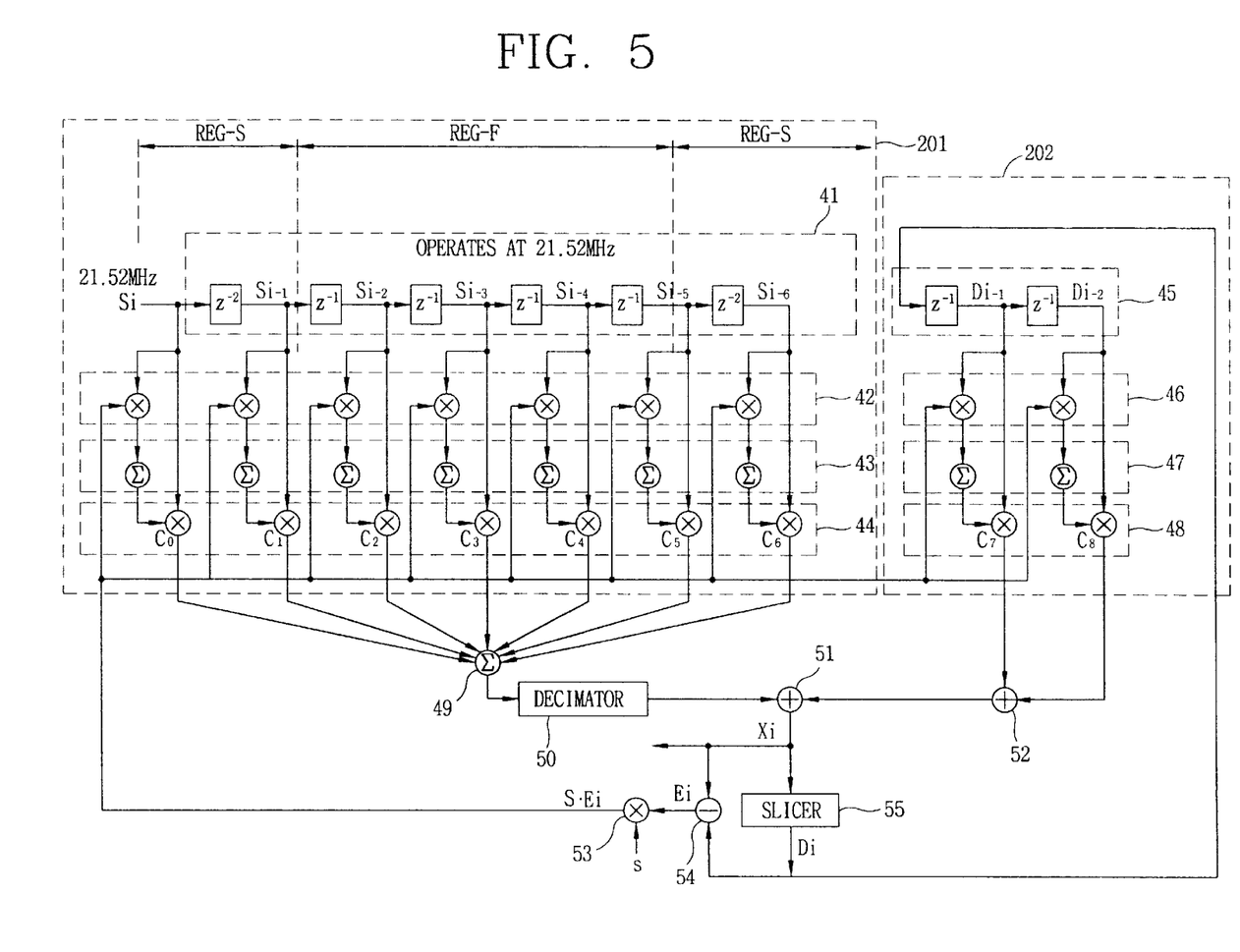
FIG. 5 is a schematic block diagram of a partial fractionally spaced equalizer for a digital television in accordance with an embodiment of the present invention.

FIG. 5 is a schematic block diagram of a partial fractionally spaced equalizer for a digital television in accordance with the present invention.

As shown in the drawing, the partial fractionally spaced equalizer for a digital television includes a feedforward filter unit 201 for receiving a sampling input signal (Si) of 21.52 MHz, a feedback filter unit 202 for receiving an output signal of a slicer which will be explained later, a first adder 49 for adding feedforward tap signals outputted from the feedforward filter unit 201, a decimator 50 for dividing the output signals of the first adder 49, a third adder 52 for adding feedback tap signals outputted from the feedback filter unit 202, a second adder 51 for adding the output signal of the decimator 50 and the output signal of the third adder 52 and generating an equalizer output signal (Xi), a slicer 55 for slicing the equalizer output signal (Xi) and generating a decision data (Di), a subtractor 54 for subtracting the equalization signal (Xi) from the decision data (Di) and generating an error signal (Ei), and a multiplier 53 for multiplying the error signal (Ei) by a predetermined step size (s) to generate a step error signal (sEi), and outputting the step error signal (sEi) to the feedforward filter unit 201 and the feedback filter unit 202.

The feedforward filter unit 201 includes a fractional spaced filter region (Reg_F) in which one tap is constructed to be at one symbol, to pass only one delay ($Z^{-1}$), and a first and a second symbol spaced filter regions (REG_S) in which two taps are constructed at one symbol space divided centering the fractional spaced filter region, to simultaneously pass the two delays ($Z^{-2}$).

The operation of the partial fractionally spaced feed channel equalizer of the present invention as described above will now be explained.

When the input signal (Si) having a sampled symbol rate of 21.52 MHz is inputted to the first delay array unit 41 of the feedforward filter unit 201 corresponding to the first symbol spaced filter region (REG_S), the delay ($Z^{-2}$) included in the first delay unit 41 delays the input signal (Si) and outputs a delayed signal (Si-1).

The delays ($Z^{-1}$) in the first delay unit 41 of the feedforward filter unit 201 corresponding to the fractionally spaced filter region (REG_F), set next to the first symbol spaced filter region (REG_S), receive the delay signal (Si-1) from the symbol spaced filter region (REG_S), sequentially delay it and generate delay signals (Si-2, . . . , Si-5).

The delay ($Z^{-2}$) in the first delay array unit 41 of the feedforward filter unit 201 corresponding to the second symbol spaced filter region (REG_S), set next to the fractionally spaced filter region (REG_F), receives the delay signal (Si-5) from the fractionally spaced filter region (REG_F), delays it and outputs a delay signal (Si-6).

The delayed signals (Si-1, Si-2, . . . , Si-6) and the input signal (Si) outputted from the first and the second symbol spaced filter regions REG_S's and the fractionally spaced filter region REG_F are outputted to first and the second multiplying unit 42 and 44.

At this time, each adder in the first adding unit 43 accumulates signals outputted from the first multiplying unit 42 and generates coefficients (C0, C1, . . . C6).

Then, the second multiplying unit 44 multiplies the input signal (Si) and the delay signals (Si-1, Si-2, . . . , Si-6) by the coefficients (C0, C1, . . . , C6) outputted from the first adding unit 43 to generate feedforward filter tap signals and outputs them to the first adder 49. Then, the first adder 49 adds the feedforward filter tap signals and outputs them to the decimator 50. That is, the first adder 49 adds the data sample and the results obtained by multiplying the data sample by the coefficients updated at the previous symbol time by means of the first delay array unit 41, the first multiplying unit 42, the first adding unit 43 and the second multiplying unit 44.

In this respect, as for the addition result outputted from the first adder 49, since the data sample is changed for every 21.52 MHz, the decimator 50 samples a signal corresponding to the symbol time among the inputted signals.

Then, the second adder 51 adds the sampled signal outputted from the decimator 50 and the signal outputted from the third adder 52 to generate an equalizer output signal (Xi), and outputs it to the subtractor 54 and the slicer 55.

Upon receipt of the equalizer output signal (Xi), the slicer 55 generates a decision data (Di) judged to be transmitted from a transmitting party by using the equalization signal (Xi), and outputs it to the subtractor 54 and the second delay array unit 45 of the feedback filter unit 202.

The subtractor 54 subtracts the equalizer output signal (Xi) from the decision data (Di) to generate an error signal (Ei), and outputs the error signal (Ei) to the multiplier 53.

Then, the multiplier 53 multiplies the error signal (Ei) by the step size (s) predetermined by the user to generate a step error signal (sEi), and outputs the step error signal (sEi) to the first multiplying unit 42 of the feedforward filter unit 201 and the third multiplying unit 52 of the feedback filter unit 202.

Meanwhile, the second delay array unit 45 of the feedback filter unit 202 receives the decision data (Di) from the slicer 55, delays it sequentially, generates delayed signals (Di-1, Di-2) and outputs them to the third and the fourth multiplying units 46 and 48.

Then, the third multiplying unit 46 multiplies the delayed signals (Di-1, Di-2) by the previous error signals (sEi-1) outputted from the multiplier 53 and outputs the multiplication result to a second adding unit 47.

Then, the second adding unit 47 accumulates multiplication results, generates coefficients (C7, C8) and outputs them to the fourth multiplying unit 48.

The fourth multiplying unit 48 multiplies the delay signals (Di-1, Di-2) by each coefficient (C7, D8) to generate feedback filter tap signals, and outputs the feedback filter tap signals to the third adder 52.

Then, the third adder 52 adds the feedback filter tap signals and outputs the addition result to the second adder 51, so that the feedback filter unit 202 is cooperatively operated with the feedforward filter unit 201.

Figure 6:
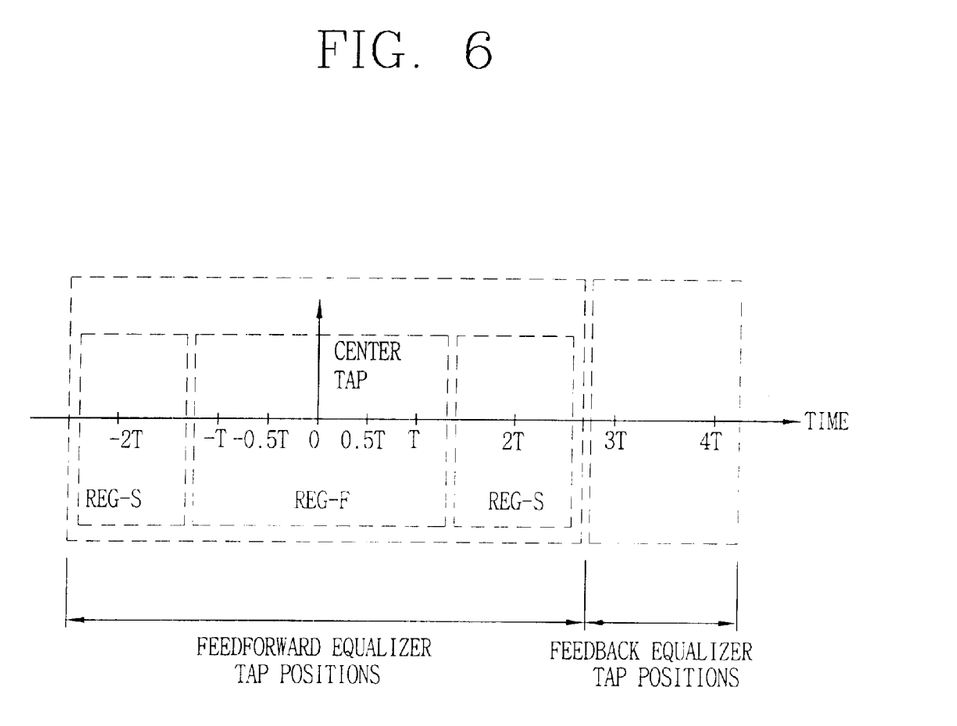
FIG. 6 is tap positions on a time axis of the partial fractionally spaced equalizer for a digital television in accordance with the present invention.

FIG. 6 is tap positions on a time axis of the partial fractionally spaced equalizer of FIG. 5, which show a removable preghost and postghost range referenced to a main tap. That is, the partial fractionally spaced equalizer with 9 taps removes ghosts a from −2 T to 4 T. Here, T is symbol time (1/10.76 MHz).

As shown in FIG. 6, as for the symbol spaced filter region (REG_S), two taps are set for one symbol space, and a symbol data always exists at the position of the tap so that an input signal passes through two delays ($Z^{-2}$) simultaneously. And, as for the fractionally spaced region (REG_F), one tap is set for one symbol space, and data between symbols is positioned at the tap so that an input signal passes through only one delay ($Z^{-2}$).

Accordingly, the partial fractionally spaced equalizer in accordance with the present invention removes preghost and postghost range referenced to a main tap between −2 T to 4 T. Here, T is symbol time (1/10.76 MHz).

Comparing the conventional equalizers, the partial fractionally spaced equalizer in accordance with the present invention removes partially and fractionally long or/and short ghosts as adaptively installing the taps depending on the generated ghosts.

Meanwhile, the feedback filter unit 202 passes the output value of the equalizer through the slicer so that the determined value is to be fed, it necessarily includes the symbol spaced tap. Since the number of bits of the symbol data is reduced at the previous stage, the number of the multipliers is many reduced than the number of the feedforward filter units, which does not affect the size of its hardware.

In this respect, in a receiver adopting a carrier retrieving method using an analog FPLL, the sampling frequency of the input signal is A/D converted by N times for the symbol frequency of a receiving signal coming down to the baseband, so as to be inputted to the equalizer.

Meanwhile, in a receiver adopting a digital carrier retrieving method, the carrier is retrieved by a digital data previously sampled by N times, of which output is inputted to the equalizer.

Figure 7:
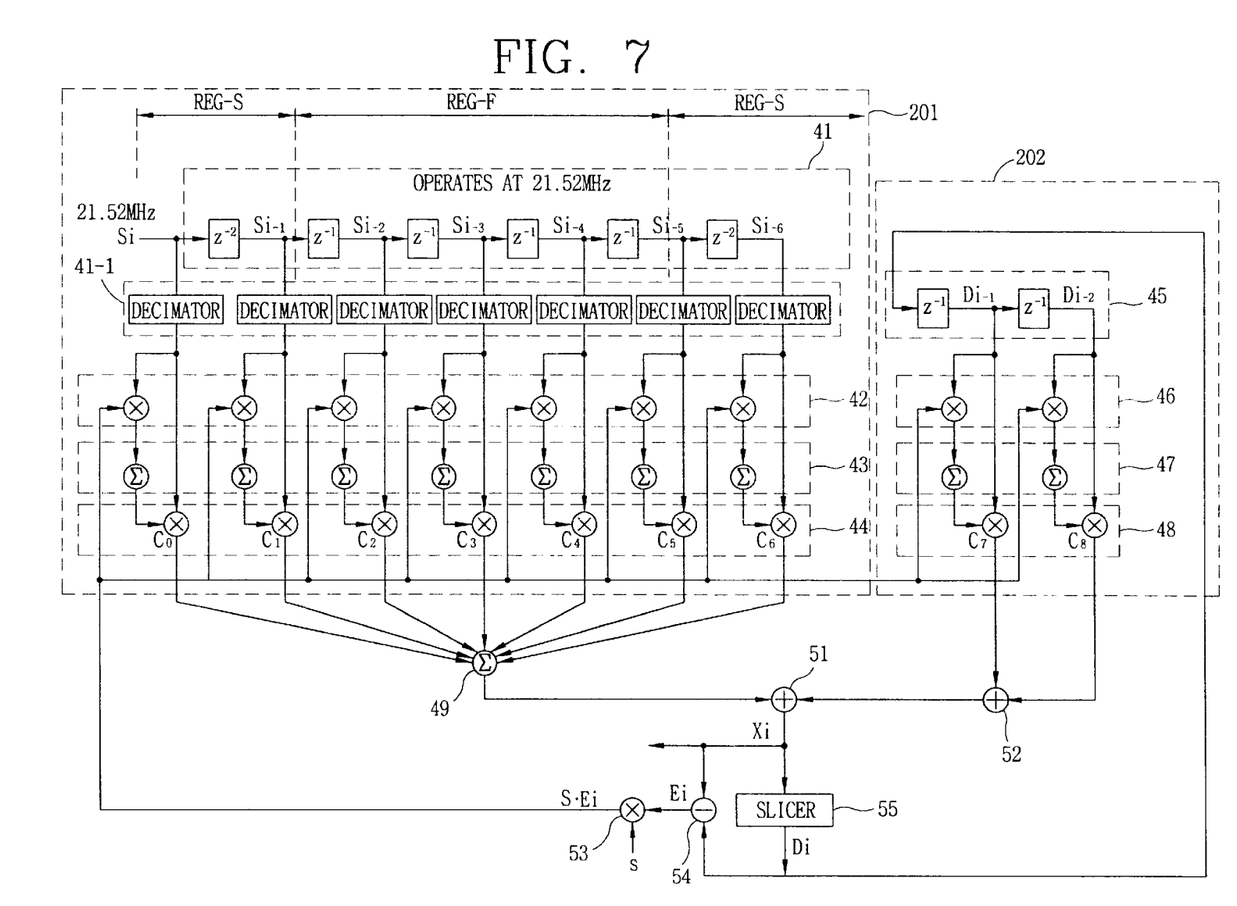
FIG. 7 is a schematic block diagram of a partial fractionally spaced equalizer for a digital television in accordance with another embodiment of the present invention.

FIG. 7 is a schematic block diagram of a partial fractionally spaced equalizer for a digital television in accordance with another embodiment of the present invention. The another embodiment of the partial fractionally spaced equalizer only differs from the positions of the decimator of the equalizer of FIG. 6.

As shown in the FIG. 7, the partial fractionally spaced equalizer comprises decimator unit 41-1 which includes a plurality of decimators corresponding to the number of taps and samples the input signal and the delayed signals from the first delay array unit 41.

Instead, the partial fractionally spaced equalizer does not install a decimator between the first adder 49 and the second adder 51.

The difference between the equalizers of FIG. 5 and of FIG. 7 is the installed position of the decimator to downsample whether the input signal and delayed signals or a multiplication result multiplied coefficients by the input signal and delayed signal by the circuit designer.

In the embodiments of the present invention, even though the decimator is positioned after the first delay array unit 201 or between the second multiplying unit and adder, it can be positioned at other position except for the above mention. Also, even though the decimator is used as flip-flop, to sample the input signal other circuit element can be used.

As so far described, according to the partial fractionally spaced channel equalizer for a digital television, when a sampled input signal (Si) of 21.52 MHz is received, a fractionally spaced tap is set for the region of the input signal where there is a noise to perform equalizing fractionally, while a symbol spaced tap is set for the other frequency region to equalize the input signal. Thus, the noise included in the input signal can be effectively removed, and the signal processing can be performed at a high speed. In addition, the size of its circuit can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A partial fractionally spaced equalizer for a digital television comprising:

a feedforward filter unit for receiving an input signal sampled at a predetermined frequency, wherein the feedforward filter unit includes first and second symbol spaced filter regions each having a symbol spaced tap and a fractionally spaced filter region centered between the first and second symbol spaced filter regions and having fractionally spaced taps narrower than the symbol spaced tap;

a feedback filter unit having symbol spaced taps;

an equalizer signal generator for processing feedforward tap signals outputted from the feedforward filter unit and the feedback tap signals outputted from the feedback filter unit and generating equalizer signals;

a slicer for slicing the equalizer signals to generate a decision data and outputting the decision data to the feedback filter unit; and an error generator for generating a compensating error signal by subtracting the equalizer signal from the decision data.

2. The equalizer according to claim 1, wherein the input signal has a sampling frequency of 21.52 MHz.

3. The equalizer according to claim 1, wherein the first and the second symbol spaced filter regions and the fractionally spaced filter region process the input signal with the same clock frequency as the predetermined frequency.

4. The equalizer according to claim 1, wherein the equalizer signal generator comprises:

a first adder for adding the feedforward tap signals;

a decimator for sampling the addition result outputted from the first adder at the same frequency as that of the input signal;

a third adder for adding the feedback tap signals; and a second adder for adding the sampled signal outputted from the decimator and the addition result outputted from the third adder, and generating the equalizer signal.

5. The equalizer according to claim 1, wherein the decimator down-samples a signal corresponding to the symbol time among inputted signals.

6. The equalizer according to claim 4, wherein the decimator comprises a flip-flop.

7. The equalizer according to claim 4, wherein the error generator comprises:

a subtractor for subtracting the equalizer signal from the decision data and outputting an error signal; and a multiplier for multiplying the error signal by a predetermined step size and generating the compensation error signal.

8. The equalizer according to claim 1, wherein the feedback filter unit further comprises a decimator unit for sampling the input signal and signals from the first and second regions.

9. The equalizer according to claim 8, wherein the decimator comprises a flip-flop.

10. The equalizer according to claim 8, wherein the equalization signal generator comprises:

a first adder for adding the feedforward tap signals;

a third adder for adding the feedback tap signals; and a second adder for adding the addition results outputted from the first and third adders, and generating the equalizer signal.

* * * * *